(12) United States Patent
Schmitz et al.

(10) Patent No.: US 12,145,474 B2
(45) Date of Patent: Nov. 19, 2024

(54) CROSS ROD FOR VEHICLE SEAT RECLINER ASSEMBLY

(71) Applicant: Fisher & Company, Incorporated, St. Clair Shores, MI (US)

(72) Inventors: Ralph L. Schmitz, Clinton Township, MI (US); Sapan M. Poptani, Northville, MI (US); Christopher J. Ryan, Fraser, MI (US)

(73) Assignee: Fisher & Company, Incorporated, St. Clair Shores, MI (US)

( * ) Notice: Subject to any disclaimer, the term of this patent is extended or adjusted under 35 U.S.C. 154(b) by 0 days.

(21) Appl. No.: 17/720,636

(22) Filed: Apr. 14, 2022

(65) Prior Publication Data
US 2022/0355709 A1    Nov. 10, 2022

Related U.S. Application Data

(60) Provisional application No. 63/184,900, filed on May 6, 2021.

(51) Int. Cl.
*B60N 2/23*    (2006.01)
*B60N 2/02*    (2006.01)
(Continued)

(52) U.S. Cl.
CPC .......... *B60N 2/02246* (2023.08); *B60N 2/20* (2013.01); *B60N 2/02253* (2023.08); *B60N 2/235* (2013.01)

(58) Field of Classification Search
CPC ................. B60N 2/20; B60N 2/235; B60N 2/2352–2362
See application file for complete search history.

(56) References Cited

U.S. PATENT DOCUMENTS

| 343,025 A | 6/1886 | Gordon |
| 910,192 A | 1/1909 | Grouvelle |

(Continued)

FOREIGN PATENT DOCUMENTS

| CN | 103025567 A | 4/2013 |
| CN | 110871716 A | 3/2020 |

(Continued)

OTHER PUBLICATIONS

U.S. Appl. No. 15/661,074, filed Jul. 27, 2017, Schmitz, Ralph L.
(Continued)

*Primary Examiner* — Syed A Islam
(74) *Attorney, Agent, or Firm* — Harness, Dickey & Pierce, P.L.C.

(57) ABSTRACT

A recliner assembly for a vehicle seat may include a pair of recliner hearts and a cross rod. Each of the recliner hearts includes a first plate and a second plate that is selectively rotatable relative to the first plate to recline a seatback relative to a seat bottom of the vehicle seat. The cross rod extends between the recliner hearts and is received in hubs of the recliner hearts. The cross rod transmits torque between the hubs. The cross rod includes ridges that are angularly spaced apart from each other. Each of the ridges includes a first sidewall, a second sidewall, and an end wall extending between the first and second sidewalls. The first and second sidewalls are defined by first and second axes that extend radially outward. The first and second axes are angled such that they do not converge with each other as they extend radially outward.

9 Claims, 5 Drawing Sheets

(51) Int. Cl.
   *B60N 2/20*     (2006.01)
   *B60N 2/235*    (2006.01)

(56) References Cited

U.S. PATENT DOCUMENTS

| | | | |
|---|---|---|---|
| 3,863,503 A * | 2/1975 | Loeb | B62M 11/04 |
| | | | 280/238 |
| 4,218,092 A | 8/1980 | Schach et al. | |
| 4,223,586 A | 9/1980 | Miller | |
| 4,451,966 A | 6/1984 | Lee | |
| 4,470,633 A | 9/1984 | Fourrey et al. | |
| 4,509,806 A | 4/1985 | Dudouyt | |
| D285,119 S | 8/1986 | Krautz | |
| 4,698,896 A | 10/1987 | Osterwald et al. | |
| D325,801 S | 4/1992 | Fasth | |
| 5,158,389 A | 10/1992 | Osterwald et al. | |
| 5,586,833 A | 12/1996 | Vossmann et al. | |
| 5,634,689 A * | 6/1997 | Putsch | B60N 2/2252 |
| | | | 475/162 |
| D415,847 S | 10/1999 | Schaefer | |
| 6,007,153 A | 12/1999 | Benoit et al. | |
| 6,024,410 A | 2/2000 | Yoshida | |
| 6,161,899 A | 12/2000 | Yu | |
| 6,283,159 B1 | 9/2001 | Tada | |
| 6,390,557 B1 | 5/2002 | Asano | |
| 6,454,354 B1 | 9/2002 | Vossmann et al. | |
| 6,836,951 B2 | 1/2005 | Dudash et al. | |
| D503,645 S | 4/2005 | Wirth et al. | |
| 7,014,265 B2 | 3/2006 | Yamada et al. | |
| 7,093,902 B2 | 8/2006 | Lehmann et al. | |
| 7,503,099 B2 | 3/2009 | Pejathaya | |
| 7,506,933 B2 | 3/2009 | Yamada et al. | |
| 7,513,573 B2 | 4/2009 | Wahls et al. | |
| 7,837,266 B2 | 11/2010 | Lehmann | |
| 7,871,128 B2 | 1/2011 | Bonk et al. | |
| D666,330 S | 8/2012 | Stamper | |
| 9,108,541 B2 | 8/2015 | Assmann et al. | |
| D745,299 S | 12/2015 | Chang | |
| D764,140 S | 8/2016 | Holzhaeuser | |
| 9,511,693 B2 | 12/2016 | Nakagawa et al. | |
| D786,172 S | 5/2017 | Komazaki et al. | |
| D787,421 S | 5/2017 | Komazaki et al. | |
| D788,018 S | 5/2017 | Komazaki et al. | |
| 9,751,432 B2 | 9/2017 | Assmann | |
| D809,994 S | 2/2018 | Braddock, III | |
| 10,065,537 B2 | 9/2018 | Noguchi et al. | |
| 10,071,656 B2 | 9/2018 | Wetzig | |
| 10,610,018 B1 * | 4/2020 | Madhu | A47C 1/027 |
| 10,800,296 B2 | 10/2020 | Schmitz et al. | |
| 2002/0000746 A1 | 1/2002 | Matsuura et al. | |
| 2002/0014797 A1 | 2/2002 | Dudash et al. | |
| 2004/0084945 A1 | 5/2004 | Toba et al. | |
| 2006/0202537 A1 | 9/2006 | Smuk | |
| 2007/0200408 A1 * | 8/2007 | Ohta | B60N 2/2252 |
| | | | 297/362.11 |
| 2008/0073961 A1 | 3/2008 | Wahls et al. | |
| 2008/0185892 A1 | 8/2008 | Peters et al. | |
| 2008/0231103 A1 | 9/2008 | Rohee | |
| 2009/0134682 A1 | 5/2009 | Andou et al. | |
| 2009/0140565 A1 | 6/2009 | Wahls et al. | |
| 2009/0250990 A1 | 10/2009 | Endo et al. | |
| 2009/0289488 A1 | 11/2009 | Mitsuhashi | |
| 2009/0302658 A1 | 12/2009 | Fassbender et al. | |
| 2010/0072802 A1 | 3/2010 | Smith et al. | |
| 2010/0109408 A1 | 5/2010 | Ohba | |
| 2010/0117429 A1 | 5/2010 | Mitsuhashi | |
| 2010/0127546 A1 | 5/2010 | Dziedzic | |
| 2010/0150645 A1 | 6/2010 | Endo et al. | |
| 2010/0194165 A1 | 8/2010 | Iguchi | |
| 2010/0231022 A1 | 9/2010 | Kim et al. | |
| 2010/0244530 A1 | 9/2010 | Kitano et al. | |
| 2010/0276976 A1 | 11/2010 | Kumazaki et al. | |
| 2011/0001346 A1 | 1/2011 | Yamada et al. | |
| 2012/0161488 A1 | 6/2012 | Ishihara et al. | |
| 2012/0242133 A1 | 9/2012 | Jaudouin et al. | |
| 2012/0261976 A1 | 10/2012 | Uebelacker et al. | |
| 2012/0279337 A1 | 11/2012 | Endo et al. | |
| 2012/0280555 A1 | 11/2012 | Blinzler et al. | |
| 2012/0292970 A1 | 11/2012 | Yamada et al. | |
| 2012/0306251 A1 | 12/2012 | Arefi et al. | |
| 2013/0026808 A1 | 1/2013 | Uramichi et al. | |
| 2013/0076094 A1 | 3/2013 | Ishihara et al. | |
| 2013/0113261 A1 | 5/2013 | Mikasa et al. | |
| 2013/0154331 A1 | 6/2013 | Ito | |
| 2013/0161994 A1 | 6/2013 | Ito | |
| 2013/0233435 A1 | 9/2013 | Henthorn et al. | |
| 2013/0291676 A1 | 11/2013 | Pleskot et al. | |
| 2014/0103693 A1 | 4/2014 | Yamada et al. | |
| 2014/0152067 A1 | 6/2014 | Pleskot et al. | |
| 2014/0159458 A1 | 6/2014 | Lu et al. | |
| 2014/0232163 A1 | 8/2014 | Eckhoff et al. | |
| 2015/0015044 A1 | 1/2015 | Teufel et al. | |
| 2015/0069809 A1 | 3/2015 | Matt | |
| 2015/0165936 A1 | 6/2015 | Wei et al. | |
| 2015/0273548 A1 | 10/2015 | Tanoue et al. | |
| 2016/0046211 A1 | 2/2016 | Assmann | |
| 2017/0021743 A1 | 1/2017 | Hiemstra et al. | |
| 2017/0058940 A1 | 3/2017 | Wehner et al. | |
| 2017/0151893 A1 | 6/2017 | Kojima et al. | |
| 2017/0158091 A1 | 6/2017 | Kojima et al. | |
| 2017/0158092 A1 | 6/2017 | Kojima et al. | |
| 2017/0253151 A1 | 9/2017 | Maeda et al. | |
| 2018/0056819 A1 | 3/2018 | Schmitz et al. | |
| 2018/0213936 A1 | 8/2018 | Sasaki et al. | |
| 2018/0238474 A1 | 8/2018 | Braddock, III | |
| 2018/0334060 A1 | 11/2018 | Yamabe | |
| 2018/0361886 A1 | 12/2018 | Chang | |
| 2020/0231070 A1 | 7/2020 | Schmitz et al. | |
| 2020/0290486 A1 | 9/2020 | Sung | |

FOREIGN PATENT DOCUMENTS

| | | |
|---|---|---|
| DE | 102008047660 A1 | 4/2010 |
| DE | 102011075364 A1 | 11/2012 |
| DE | 202018105268 U1 | 9/2018 |
| JP | 2007229055 A | 9/2007 |
| WO | 2008-130075 A1 | 10/2008 |

OTHER PUBLICATIONS

U.S. Appl. No. 16/722,230, filed Dec. 20, 2019, Schmitz, Ralph L.
Office Action regarding U.S. Appl. No. 15/437,877, dated Dec. 31, 2018.
Office Action regarding German Patent Application No. 10 2020 200 019.0, dated Jul. 27, 2021.
Office Action regarding Chinese Patent Application No. 202010014433.8, dated Nov. 26, 2021.
German Office Action for German Patent Application No. 10 2017 119 166.6 dated Jan. 21, 2022.
Office Action regarding Chinese Patent Application No. 2020100144338, dated Jun. 29, 2022.
Chinese Office Action regarding Patent Application No. 2020100144338, dated Oct. 13, 2022.
First Examination Report issued on Jul. 26, 2023 by the German Patent and Trademark Office for German Application No. 102022204380.4.
Non-Final Office Action regarding U.S. Appl. No. 17/720,636 dated Apr. 26, 2023.
Chinese Office Action regarding Patent Application No. 202210481866.3, dated Jun. 1, 2023.
Chinese Office Action regarding Patent Application No. 202210481866.3, dated Dec. 19, 2023.

* cited by examiner

US 12,145,474 B2

CROSS ROD FOR VEHICLE SEAT RECLINER ASSEMBLY

CROSS-REFERENCE TO RELATED APPLICATIONS

This application claims the benefit of U.S. Provisional Application No. 63/184,900, filed on May 6, 2021. The entire disclosure of the above application is incorporated herein by reference.

FIELD

The present disclosure relates to a cross rod for a vehicle seat recliner assembly.

BACKGROUND

This section provides background information related to the present disclosure and is not necessarily prior art.

Vehicle seats often include a recliner assembly that can selectively rotate a seatback relative to a seat bottom between reclined and upright positions. The recliner assembly can include a pair of recliner hearts and a cross rod that is engaged with the recliner hearts and transmits torque between the recliner hearts. The present disclosure provides an improved cross rod that is relatively lightweight and reduces stresses on hubs of the recliner hearts to prevent cracking of the hubs.

SUMMARY

This section provides a general summary of the disclosure, and is not a comprehensive disclosure of its full scope or all of its features.

The present disclosure provides a recliner assembly for a vehicle seat. The recliner assembly may include a pair of recliner hearts and a cross rod. Each of the recliner hearts includes a first plate and a second plate that is selectively rotatable relative to the first plate to recline a seatback of the vehicle seat relative to a seat bottom of the vehicle seat. Each of the recliner hearts also includes a hub extending through the first and second plates. The hub is configured to selectively actuate the recliner heart. The cross rod extends between the recliner hearts and is at least partially received in an aperture in the hub of the recliner hearts. The cross rod transmits torque between the hubs of the recliner hearts. The cross rod includes a plurality of ridges that are angularly spaced apart from each other. Each of the ridges includes a first sidewall, a second sidewall, and an end wall extending from the first sidewall to the second sidewall. The first sidewall is defined by a first axis that extends radially outward. The second sidewall is defined by a second axis that extends radially outward. The first and second axes are angled relative to each other such that the first and second axes do not converge with each other as the first and second axes extend radially outward from the cross rod.

In some configurations, the apertures in the hubs receive at least portions of the ridges, and the apertures have cross-sectional profiles that match the cross-sectional profiles of the cross rod.

In some configurations, the first and second axes diverge from each other as the first and second axes extend radially outward from the cross rod.

In some configurations, the first sidewall exerts a force on the hub during rotation of the cross rod. A vector of the force may be at an angle relative to a radial line that bisects the ridge. The angle may be greater than zero degrees and less than 90 degrees.

In some configurations, the first and second axes are parallel to each other.

In some configurations, the first sidewall exerts a force on the hub during rotation of the cross rod. A vector of the force may be perpendicular to a radial line that bisects the ridge.

In some configurations, each ridge spans an entire axial length of the cross rod.

In some configurations, the recliner assembly includes a motor that drives the cross rod to rotate the second plate relative to the first plate. In other configurations, the recliner assembly is manually actuated.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Figure 1:
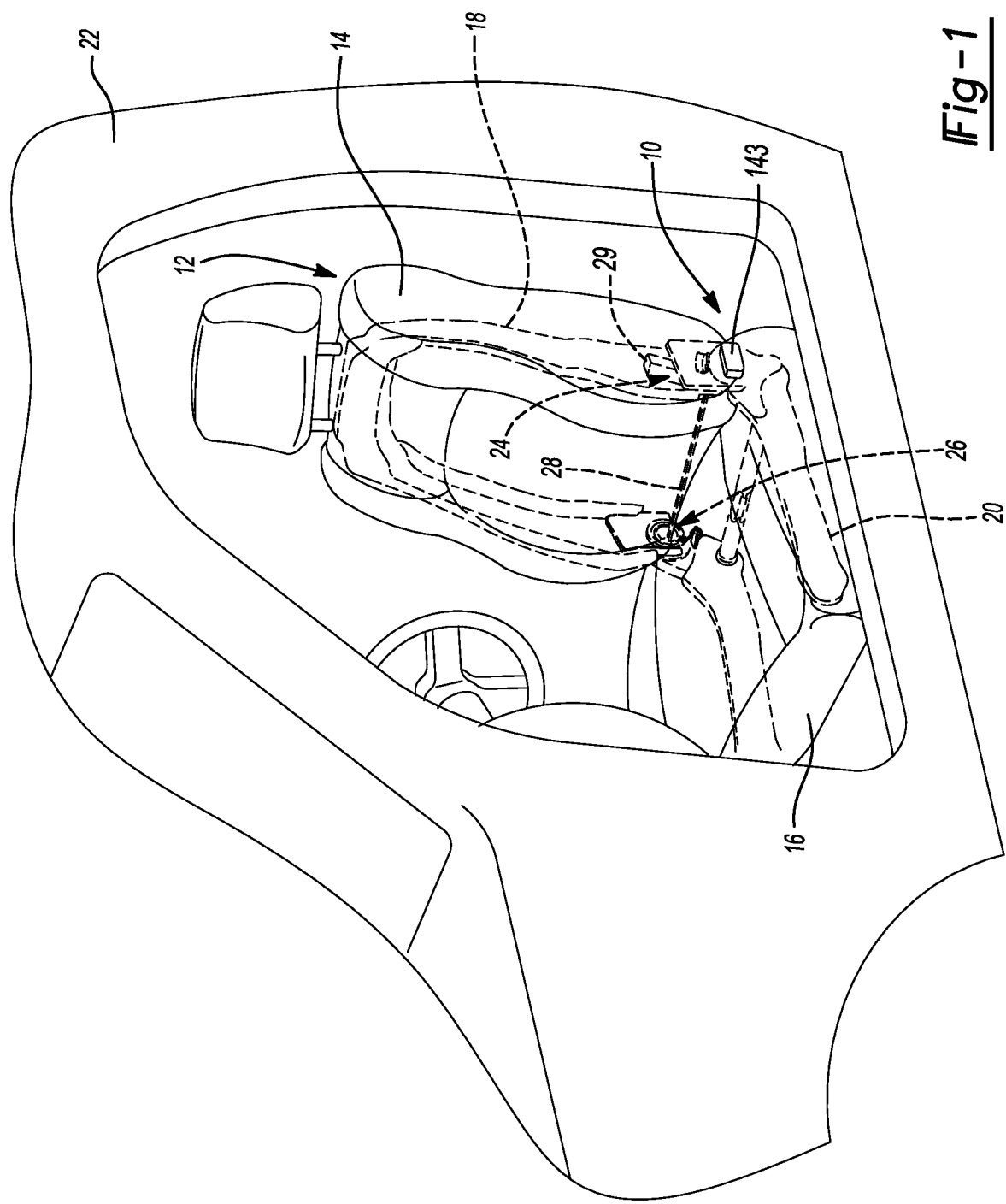
FIG. 1 is a partial perspective view of a vehicle having a seat incorporating a recliner assembly according to the principles of the present disclosure.

Example embodiments will now be described more fully with reference to the accompanying drawings.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

With reference to FIGS. 1-4, a recliner assembly 10 is provided that may be incorporated into a vehicle seat assembly 12 having a seatback 14 and a seat bottom 16. The seatback 14 and seat bottom 16 may include a seatback frame 18 and a seat bottom frame 20, respectively. The seat assembly 12 may be positioned in a vehicle 22, as shown in FIG. 1. The recliner assembly 10 may include a first recliner mechanism 24, a second recliner mechanism 26, a cross rod 28, and a motor 29.

The first and second recliner mechanisms 24, 26 may be operable in a locked state preventing relative rotation between the seatback 14 and the seat bottom 16 and an unlocked state permitting relative rotation between the seatback 14 and the seat bottom 16 among an upright position (FIG. 1), a rearward reclined position (not shown) and a forward dump position (not shown). The cross rod 28 is coupled to the first and second recliner mechanisms 26 and transmits torque between the first and second recliner mechanisms 24, 26. The motor 29 may drive the first and second recliner mechanisms 24, 26 among the upright, reclined, and forward dump positions. Alternatively, the first and second recliner mechanisms 24, 26 could be manually driven.

Figure 2:
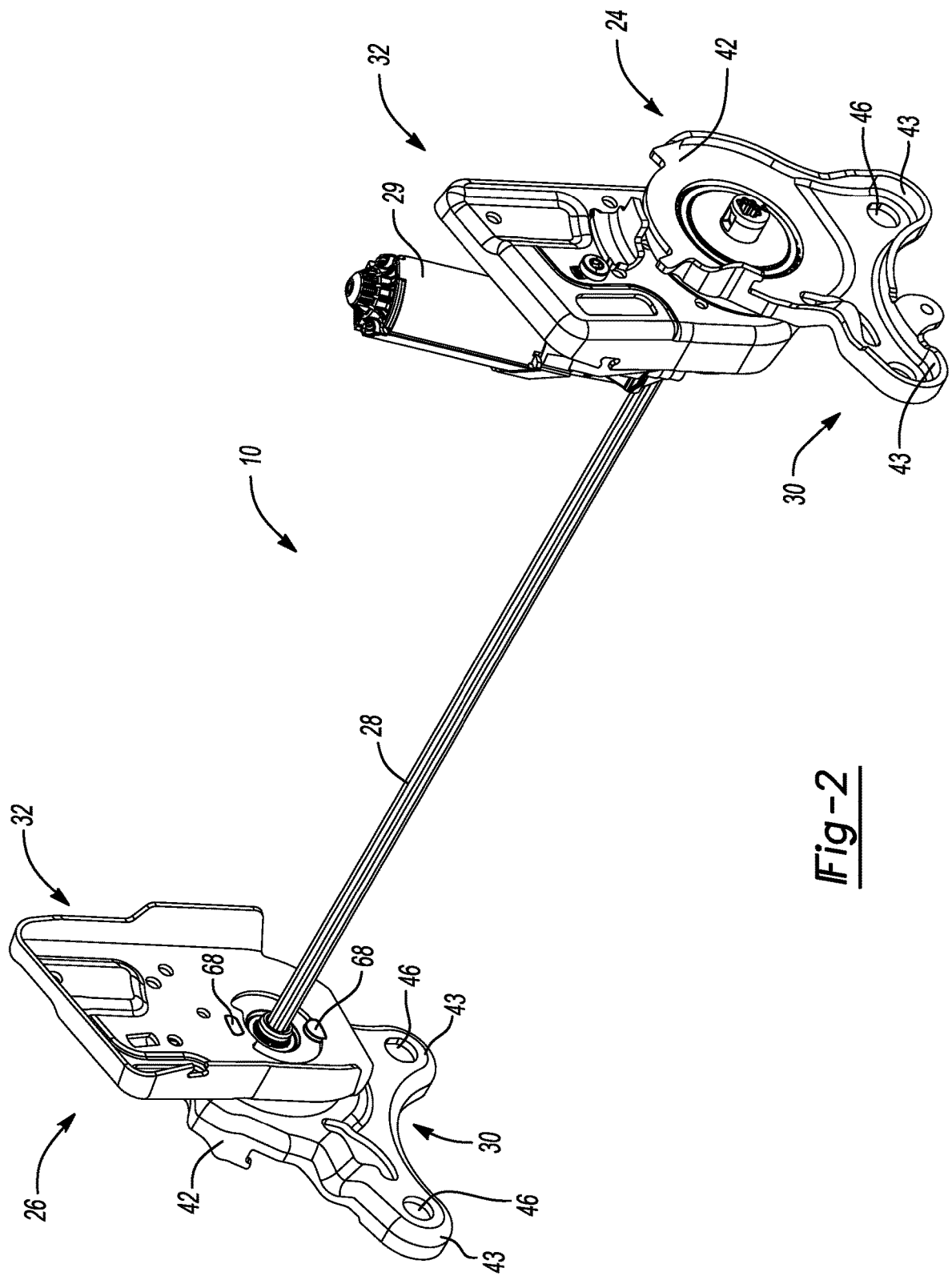
FIG. 2 is a perspective view of the recliner assembly of FIG. 1.
Figure 3:
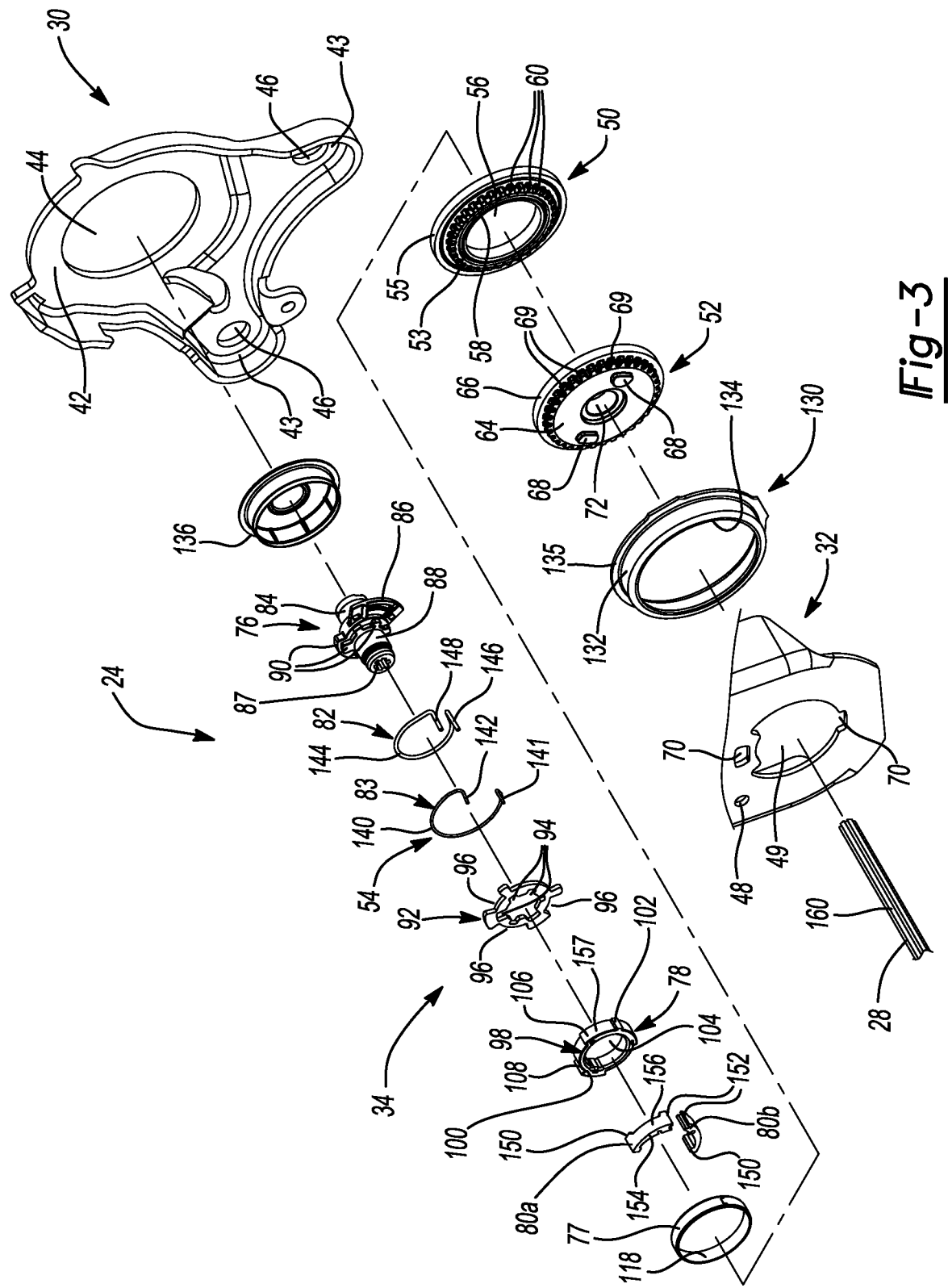
FIG. 3 is a partial exploded view of the recliner assembly.

As shown in FIGS. 2 and 3, the first recliner mechanism 24 may include a first bracket 30, a second bracket 32 and a recliner heart (or locking mechanism) 34. The first bracket 30 may include a generally round main body 42 and a pair of mounting lobes 43 that extend outward from the main body 42. The main body 42 may define a central aperture 44. The mounting lobes 43 may include a plurality of apertures 46 through which fasteners (not shown) may extend to securely attach the first bracket 30 to the seat bottom frame 20 of the seat assembly 12.

As shown in FIGS. 2 and 3, the second bracket 32 may be generally rectangular and may include a plurality of apertures 48, and a central aperture 49 through which the cross rod 28 extends. Fasteners (not shown) may extend through the plurality of apertures 48 to securely attach the second bracket 32 to the seatback frame 18 of the seat assembly 12.

Figure 4:
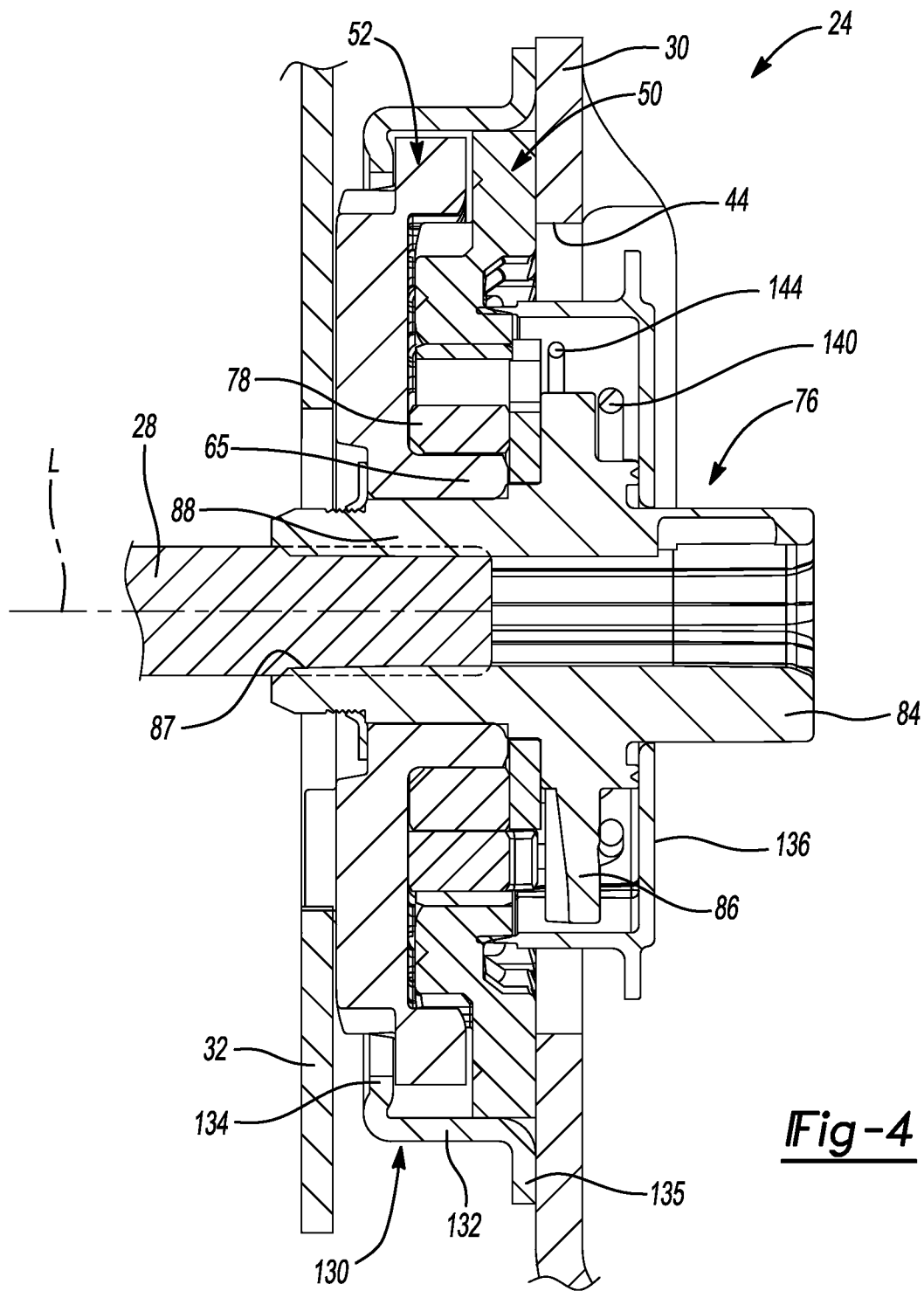
FIG. 4 is a cross-sectional view of a recliner heart of the recliner assembly.

The recliner heart 34 may be mounted to the first and second brackets 30, 32 and may selectively permit relative rotation between the seatback 14 and the seat bottom 16. The recliner heart 34 may be a round recliner heart, for example, or any other suitable type of recliner heart. As shown in FIGS. 3 and 4, the recliner heart 34 may include a first locking plate 50, a second locking plate 52 and a locking assembly 54.

The first locking plate 50 may be rotationally fixed to the first bracket 30 and may have a generally circular shape. The first locking plate 50 may include an inner section 53 and a rim or outer section 55. The inner section 53 may define an opening 56 and may include an outer diametrical surface 58 having teeth 60 thereon. The rim 55 may be rotationally fixed to the first bracket 30 and may extend 360 degrees around a periphery of the inner section 53. The rim 55 may include an inner diametrical surface having teeth 62 thereon.

The second locking plate 52 may have a generally circular shape and may include a plate body 64, a hub 65 and a rim 66. The plate body 64 may include projections 68 and teeth 69. The projections 68 may extend from a surface of the plate body 64 and may be received in respective openings 70 of the second bracket 32, thereby rotationally fixing the second locking plate 52 and the seatback 14. The teeth 69 may extend 360 degrees around an outer diametrical surface of the plate body 64. The hub 65 may extend from a center portion of the plate body 64 in a direction opposite of the projections 68 and may define an opening 72 extending therethrough. The rim 66 may extend 360 degrees around a periphery of the plate body 64 and may include teeth 74 that extend 360 degrees around an inner diametrical surface of the rim 66.

The locking assembly 54 may include a hub 76, a bushing ring 77, a cam 78, a pair of wedges 80a, 80b and first and second springs or biasing members 82, 83. As shown in FIG. 4, the hub 76 may include a hub portion 84, a flange portion 86 and a shaft portion 88. The flange portion 86 may extend radially outward relative to the hub portion 84 and shaft portion 88. The flange portion 86 may include a pair of first projections 89a, 89b that extend axially from a first side of the flange portion 86 and a pair of second projections 91a, 91b that extend axially from a second side of the flange portion 86. The flange portion 86 may also include a curved slot 93 that extends through the first and second sides of the flange portion 86. Each first projection 89a, 89b may define a groove 95. The shaft portion 88 may extend axially from one side of the flange portion 86 and the hub portion 84 may extend axially from the other side of the flange portion 86. The shaft portion 88 may extend through the cam 78, the bushing ring 77, the opening 56 of the first locking plate 50 and the opening 72 of the hub 65 of the second locking plate 52. The shaft portion 88 may include a plurality of radially extending protrusions 90. The cross rod 28 may be received in an aperture 87 of the hub 76 such that the hub 76 is drivingly engaged with the cross rod 28. In this way, rotation of the cross rod 28 causes corresponding rotation of the hub 76. The motor 29 can engage (directly or indirectly) the cross rod 28 and can drive rotation of the cross rod 28, which, in turn, causes corresponding rotation of the recliner mechanisms 24, 26.

A transfer plate 92 may be disposed between the flange portion 86 and the cam 78, and may include a plurality of first rectangular-shaped slots 94 and a plurality of second rectangular-shaped slots 96. Each protrusion 90 may be received in a respective first slot 94, thereby rotationally fixing the transfer plate 92 to the hub 76. The bushing ring 77 may be pressed-fitted into the opening 56 of the first locking plate 50 and between the inner section 53 of the first locking plate 50 and the cam 78.

The cam 78 may be disposed around the hub 65 of the second locking plate 52 and may include a body 98, an attachment portion 100 and a distal portion 102. The body 98 may be circular in shape and may define an aperture 104 that receives the hub 65 of the second locking plate 52. The body 98 may have a first portion 106 and a second portion 108. The first portion 106 may have a thickness that is greater than a thickness of the second portion 108 of the body 98.

The attachment portion 100 may be rectangular-shaped and may be integral with an outer surface of the second portion 108 of the body 98. The attachment portion 100 may include an end that extends through one of the second slots 96 of the transfer plate 92 such that the cam 78 and the hub 76 are rotationally fixed to each other. The distal portion 102 may be integral with an outer surface of the first portion 106 such that it is 180 degrees opposite the attachment portion 100.

The wedges 80a, 80b are disposed between the body 98 and the bushing ring 77. Each wedge 80a, 80b has a first end 150 and a second end 152. The first end 150 extends into a respective second slot 96 of the transfer plate 92. Each wedge 80a, 80b increases in thickness from the first end 150 toward the second end 152. Each wedge 80a, 80b also has a groove at or near the second end 152 that receives the first spring 82 such that the first spring 82 forces the wedges 80a, 80b outwardly and away from the distal portion 102. Each wedge 80a, 80b also has a curved inner surface 154 and a curved outer surface 156. The inner surface 154 may contact a surface 157 of the first portion 106 of the body 98. The inner surface 154 may include a groove that receives the second spring 83 such that the second spring 83 further forces the wedges 80a, 80b outwardly and away from the distal portion 102. The outer surface 156 may contact the inside surface 118 of the bushing ring 77.

The first spring 82 includes a curved (or arc shaped) body 140, a first leg 141, and a second leg 142. The body 140 extends at least partially around a circumferential surface of the hub 76 and is at least partially received in the grooves 95 of the projections 89a, 89b of the hub 76 so that the hub 76 slides along the body 140 when rotated. The first leg 141 extends from a first end of the body 140 and the second leg 142 extends from a second end of the body 140. The first and second legs 141, 142 extend through the curved slot 93 of the hub 76 and are received in the grooves of the wedges 80a, 80b, respectively.

The second spring 83 includes a curved (or arc shaped) body 144, a first leg 146, and a second leg 148. The body 144 extends at least partially around a circumferential surface of the hub 76. The first leg 146 extends from a first end of the body 144 and is received in the groove of the wedge 80a, and the second leg 148 extends from an opposing second end of the body 144 and is received in the groove 159 of the wedge 80b. The first spring 82 has a first spring force that is greater than a second spring force of the second spring 83. The second spring force is applied to the wedges 80a, 80b independently of the first spring force. The second spring 83 surrounds the first spring 82.

An encapsulating ring 130 may include a body 132, a lip 134 that extends radially inwardly from a first axial end of the body 132, and a flange 135 that extends radially outwardly from a second axial end of the body 132. The body 132 may be attached (e.g., by welding) to the first locking plate 50 to hold the recliner heart 34 together and also to cover a periphery of the recliner heart 34, thereby preventing debris and fluid from infiltrating and damaging the recliner heart 34. A circular-shaped cap 136 may be attached (e.g., welding) to the flange portion 86 and may cover the recliner heart 34, thereby preventing debris and fluid from infiltrating and damaging the recliner heart 34.

The structure and function of the second recliner mechanism 26 may be similar or identical to that of the first recliner mechanism 24, and therefore, will not be described again in detail.

Figure 5:
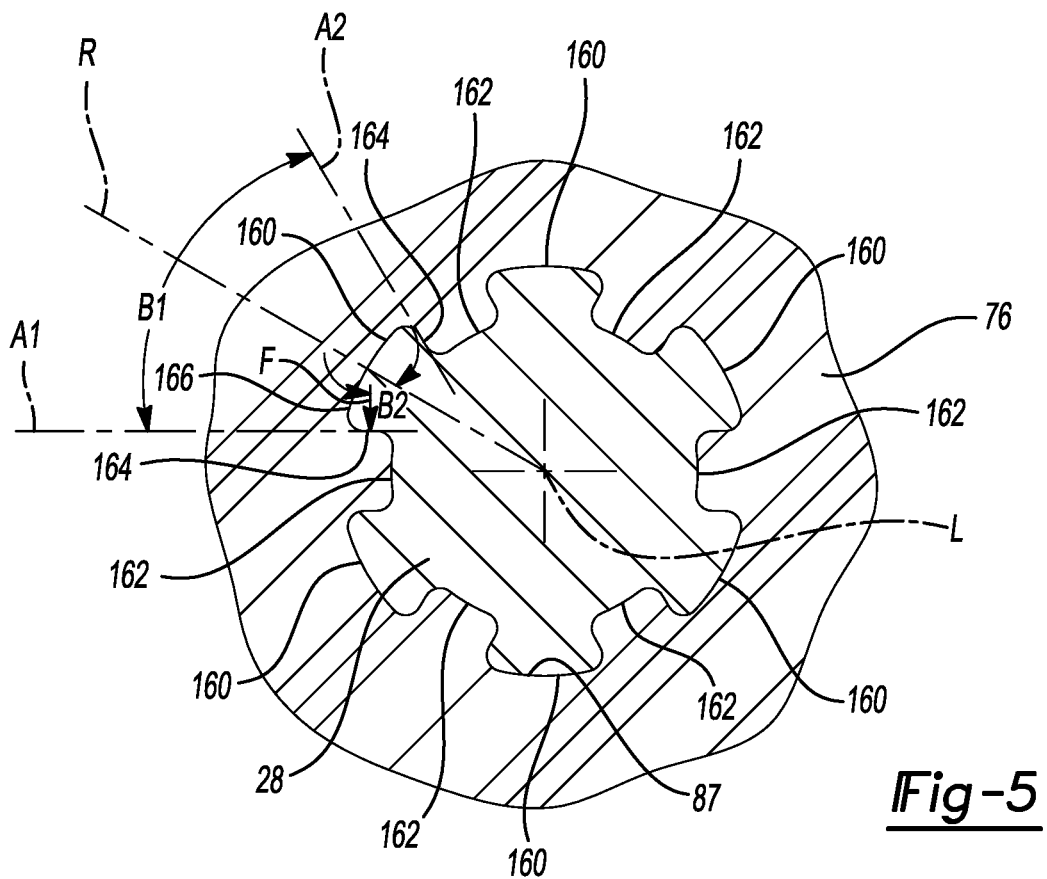
FIG. 5 is a partial cross-sectional view of a cross rod and a hub of the recliner heart.

As shown in FIGS. 2 and 4, the cross rod 28 is an elongated rod that extends between the first and second recliner mechanisms 24, 26 and is received in aperture 87 of the hub 76 of each of the first and second recliner mechanisms 24, 26. As shown in FIG. 5, the cross rod 28 includes a plurality of protrusions or ridges 160. While the ridges 160 of the cross rod 28 shown in the figures span the entire length of the cross rod 28 (i.e., from one end of the cross rod 28 to the other end of the cross rod 28), in some configurations, the ridges 160 could be formed only at and near the ends of the cross rod 28 (i.e., the portions of the cross rod 28 received in the hubs 76 of the recliner mechanisms 24, 26).

As shown in FIG. 5, the ridges 160 are arranged in a circular pattern surrounding a longitudinal axis L of the cross rod 28. The ridges 160 are spaced angularly apart from each other such that each pair of adjacent ridges 160 defines a recess 162 therebetween. The aperture 87 of the hub 76 has a cross-sectional profile that substantially matches the cross-sectional profile of the cross rod 28. That is, the apertures 87 of the hubs 76 include ridges and recesses shaped to correspond to the ridges 160 and recesses 162 of the cross rod 28 (i.e., ridges of the aperture 87 fit within recesses 162 of the cross rod 28, and ridges 160 of the cross rod 28 fits within the recesses of the aperture 87).

As shown in FIG. 5, each of the ridges 160 of the cross rod 28 includes a pair of sidewalls 164 and an end wall 166. In some examples, for each ridge 160, an angle B1 between the two sidewalls 164 of the ridge 160 may be 0-90 degrees (the angle B1 of the cross rod 28 shown in FIG. 5 is greater than zero degrees and less than 90 degrees). For example, for each ridge 160, the two sidewalls 164 of the ridge 160 are angled relative to each other such that an axis A1 defining a cross-sectional profile (i.e., at a cross-sectional plane that is perpendicular to the longitudinal axis L, as shown in FIG. 5) of one of the two sidewalls 164 is angled relative to an axis A2 of the other of the two sidewalls 164 in a manner such that the axes A1, A2 diverge from each other as the axes A1, A2 extend radially outward from the cross rod 28.

During rotation of the cross rod 28 (i.e., during operation of the recliner assembly 10), each sidewall 164 exerts a force on a mating surface of the hub 76. A vector F of that force is perpendicular to the sidewall 164 (and axis A1) and the mating surface of the hub 76. The sidewalls 164 of each ridge 160 may be configured such that the force vector F of a sidewall 164 is at an angle B2 relative to a radial line R; where the angle B2 is 0-90 degrees and faces radially inward, and the radial line R is a line that extends radially outwardly from the longitudinal axis L and bisects the ridge 160 (i.e., radial line R is disposed angularly midway between the two sidewalls 164 of the ridge 160). The angle B2 of the cross rod 28 shown in FIG. 5 is greater than zero degrees and less than 90 degrees.

Figure 6:
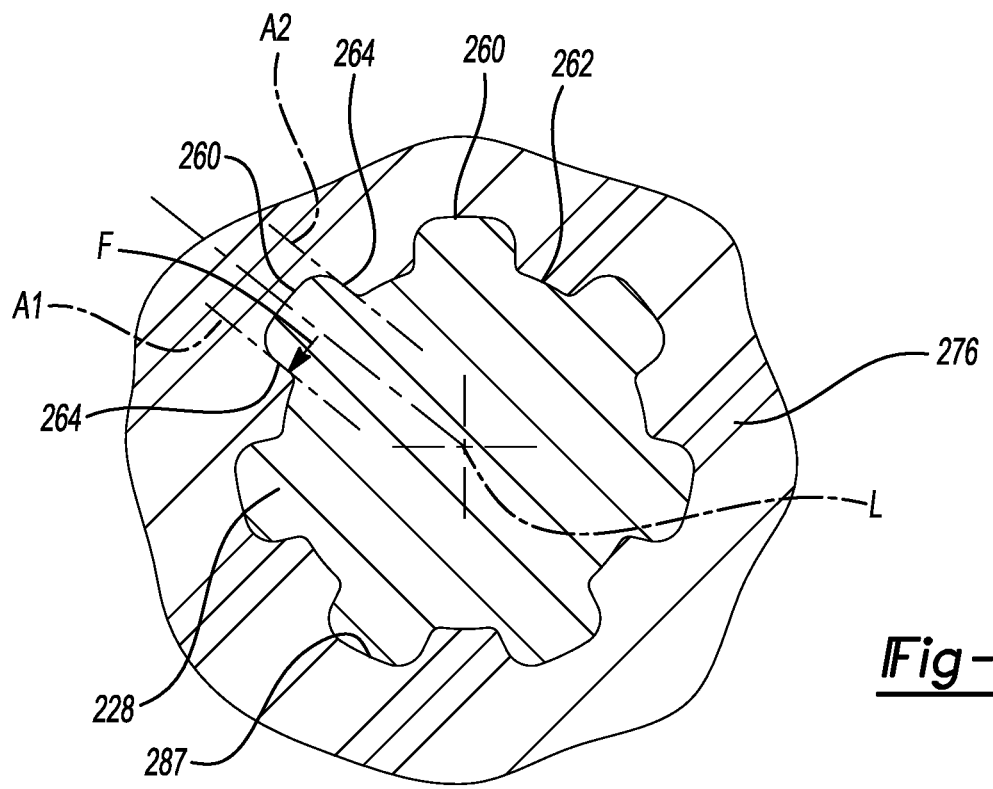
FIG. 6 is a partial cross-sectional view of an alternative cross rod and an alternative hub of a recliner heart.

FIG. 6 shows an alternative cross rod 228 and hub 276 that could be incorporated into the recliner assembly 10 instead of the cross rod 28 and hub 76. The structure and function of the cross rod 228 and hub 276 may be similar or identical to that of the cross rod 28 and hub 76, apart from differences described below and/or shown in the figures. Therefore, similar features will not be described again in detail.

Like the cross rod 28, the cross rod 228 includes a plurality of ridges 260. Each pair of adjacent ridges 260 defines a recess 262 therebetween. Each ridge 260 includes a pair of sidewalls 264. The sidewalls 264 are parallel to each other (i.e., the angle B1 between the sidewalls 264 is zero degrees, and the angle B2 between force vector F and the axis A1 is 90 degrees). The hub 276 may be identical to the hub 76, except the cross-sectional profile of an aperture 287 of the hub 276 is shaped to match the cross-sectional profile of the cross rod 228.

The shapes of the sidewalls 164, 264 of the ridges 160, 260 of the cross rods 28, 228 described above and shown in FIGS. 5 and 6 prevents the cross rod 28, 228 from cracking (or otherwise damaging) the hub 76, 276. Unlike the cross rods 28, 228 described above and shown in the figures, a cross rod having ridges with axes A1, A2 angled such that the axes converge as they extend radially outward would tend to stress the hub 76, 276 in a manner that could cause cracking and/or other damage to the hub 76, 276.

While the recliner assembly 10 is described above as being a motor-drive recliner assembly, it will be appreciated that the cross rod 28, 228 could be incorporated into a manually actuated recliner assembly.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A recliner assembly for a vehicle seat, the recliner assembly comprising:
a pair of recliner hearts each including a first plate and a second plate that is selectively rotatable relative to the first plate to recline a seatback of the vehicle seat relative to a seat bottom of the vehicle seat, each of the recliner hearts including a hub extending through the first and second plates and configured to selectively actuate the recliner heart; and
a cross rod extending between the recliner hearts and at least partially received in an aperture in the hub of the recliner hearts, the cross rod transmitting torque between the hubs of the recliner hearts,
wherein:
the cross rod includes a plurality of ridges that are angularly spaced apart from each other,
each of the ridges includes a first sidewall, a second sidewall, and an end wall extending from the first sidewall to the second sidewall,
the first sidewall is defined by a first axis that extends radially outward, and the second sidewall is defined by a second axis that extends radially outward, and
the first and second axes are angled relative to each other such that the first and second axes do not converge with each other as the first and second axes extend radially outward from the cross rod,
the first and second axes diverge from each other as the first and second axes extend radially outward from the cross rod,
the first sidewall exerts a force on the hub during rotation of the cross rod, wherein a vector of the force is at an angle relative to a radial line that bisects the ridge, and wherein the angle is greater than zero degrees and less than 90 degrees, and
the first and second sidewalls of one of the ridges are disposed at non-zero and non-perpendicular angles relative to the first and second sidewalls of an adjacent one of the ridges.

2. The recliner assembly of claim 1, wherein the apertures in the hubs receive at least portions of the ridges, and wherein the apertures have cross-sectional profiles that match the cross-sectional profiles of the cross rod.

3. The recliner assembly of claim 1, wherein each ridge spans an entire axial length of the cross rod.

4. The recliner assembly of claim 1, further comprising a motor that drives the cross rod.

5. A vehicle seat comprising:
a seat bottom;
a seatback that is rotatable relative to the seat bottom;
a recliner assembly attached to the seat bottom and the seatback, the recliner assembly including:
a pair of recliner hearts each including a first plate and a second plate that is selectively rotatable relative to the first plate to recline the seatback relative to the seat bottom, each of the recliner hearts including a hub extending through the first and second plates and configured to selectively actuate the recliner heart; and
a cross rod extending between the recliner hearts and at least partially received in an aperture in the hub of the recliner hearts, the cross rod transmitting torque between the hubs of the recliner hearts,
wherein:
the cross rod includes a plurality of ridges that are angularly spaced apart from each other,
each of the ridges includes a first sidewall, a second sidewall, and an end wall extending from the first sidewall to the second sidewall,
the first sidewall is defined by a first axis that extends radially outward, and the second sidewall is defined by a second axis that extends radially outward, and
the first and second axes are angled relative to each other such that the first and second axes do not converge with each other as the first and second axes extend radially outward from the cross rod, the first and second axes diverge from each other as the first and second axes extend radially outward from the cross rod, and the first and second sidewalls of one of the ridges are disposed at non-zero and non-perpendicular angles relative to the first and second sidewalls of an adjacent one of the ridges.

6. The vehicle seat of claim 5, wherein the apertures in the hubs receive at least portions of the ridges, and wherein the apertures have cross-sectional profiles that match the cross-sectional profiles of the cross rod.

7. The vehicle seat of claim 5, wherein the first sidewall exerts a force on the hub during rotation of the cross rod, wherein a vector of the force is at an angle relative to a radial line that bisects the ridge, and wherein the angle is greater than zero degrees and less than 90 degrees.

8. The vehicle seat of claim 5, wherein each ridge spans an entire axial length of the cross rod.

9. The vehicle seat of claim 5, further comprising a motor that drives the cross rod.

* * * * *